United States Patent Office 2,959,926
Patented Nov. 15, 1960

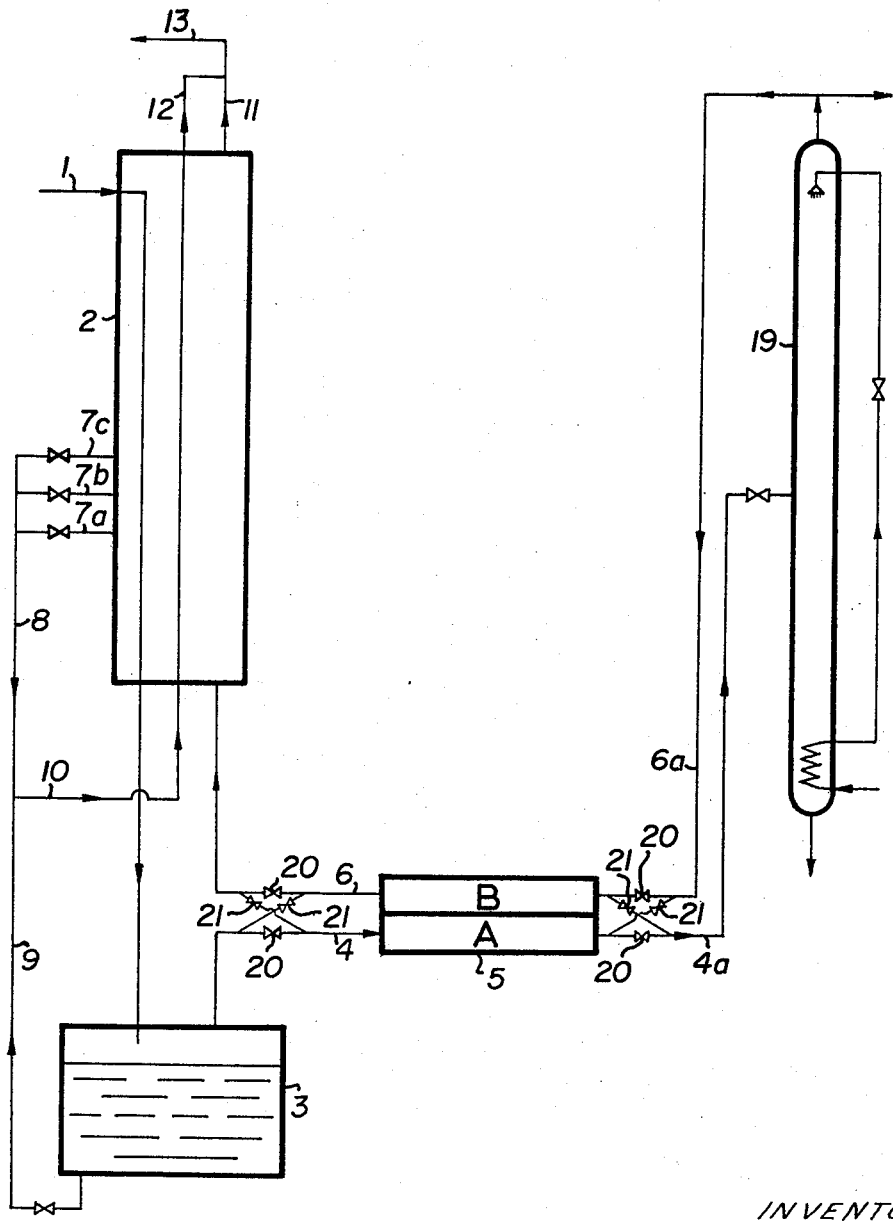

2,959,926

GENERATION OF COLD OR COOLING BY EVAPORATION OF A LIQUID EVAPORATING AT A VERY LOW TEMPERATURE

Pieter J. Haringhuizen, Geleen, Netherlands, assignor to Stamicarbon N.V., Heerlen, Netherlands Filed July 11, 1957, Ser. No. 671,226

Claims priority, application Netherlands July 11, 1956

2 Claims. (Cl. 62—13)

This invention relates to the preparation of gases from gas mixtures involving the fractional condensation or fractional condensation and distillation of the gas mixtures under very low temperature conditions. The invention is related to the invention described and claimed in my co-pending application, Serial No. 563,374, filed February 3, 1956, Patent No. 2,849,867, issued September 2, 1958.

In processes involving the cooling of a gas mixture or gas mixtures in order to remove a component or components of the mixtures as condensate, it is common practice to recover cold used in the condensation by evaporating condensate while it is in heat-exchange relation with a gas or gas mixture to be cooled.

Cold will usually be recovered not only from condensate but also from gas constituting a more volatile component or components of an original gas mixture or mixtures by conducting such cold gaseous component in heat-exchange relation with a mixture to be cooled. For example, in the preparation of ammonia synthesis gas mixtures using hydrogen obtained from coke oven gas which is cooled to condense out fractions of ethylene, methane and carbon monoxide, cold required for the condensation is generated by evaporating these fractions and liquefied nitrogen in countercurrent heat-exchange relation with the coke oven gas to be cooled and also by conducting the cold hydrogen in heat-exchange relation with such gas while the hydrogen is still subjected to the fractional condensation pressure of about 13 atm.

In the preparation of an ammonia synthesis gas mixture in order to attain maximum cold recovery, part of the nitrogen is sometimes added in the liquid state to the cold hydrogen and evaporated while the hydrogen-nitrogen mixture is conducted in countercurrent heat-exchange relation with the coke oven gas to be cooled. The liquid nitrogen then evaporates in an atmosphere of hydrogen and nitrogen under the gradually rising partial nitrogen pressure.

However, the procedure of improving cold recovery from a cold gas and a less volatile substance in the liquid state by combining these substances and using the mixture as coolant while the liquefied substance evaporates cannot always be so readily used as in the case of the preparation of an $NH_3$-synthesis gas mixture as above referred to. In the recovery of deuterium from hydrogen derived from an $NH_3$-synthesis gas mixture or a mixture of hydrogen and carbon monoxide, where prior to the fractional distillation for the isolation of deuterium the nitrogen (or carbon monoxide) must first be removed by cooling the hydrogen in two stages, first to remove the greater part of the nitrogen (or carbon monoxide) in the liquid state and then to deposit the residual nitrogen or carbon monoxide in the solid state, cold is recoverable both from the rectified hydrogen and by evaporation of the liquefied nitrogen or carbon monoxide. Due to the temperature and pressure conditions involved in the deuterium recovery process, the simple combination of the liquefied component and the rectified hydrogen prior to the heat-exchange with the warmer hydrogen passing towards the rectifying column gives rise to difficulties. The temperatures are only a little above the solidification point of the nitrogen (or carbon monoxide), and as the pressure of the hydrogen returning from the rectifier (about 1.3 atm.) is also considerably lower than in the separation of coke oven gas, the cooling resulting from the evaporation of the liquid nitrogen under the very low initial partial pressure becomes so deep that the liquid nitrogen or carbon monoxide solidifies, causing blockage of the apparatus.

The liquefied nitrogen or carbon monoxide may, after expansion, be evaporated in heat-exchange with the original hydrogen to be cooled, in a pipe system separated from that used to convey the rectified hydrogen, and subsequently added to the hydrogen after compression. In this way evaporation commences at a level considerably higher than the solidification point, but the cold imparted to the hydrogen prior to the rectification in order to reduce the temperature from this level to a temperature in the vicinity of the solidification point of the nitrogen or carbon monoxide is not recovered.

It is an object of the present invention to further improve the generation of cold.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Now in a process for obtaining cooling at a very low temperature in a system by addition of a less volatile liquefied gas to a more volatile non-liquefied gas having a low pressure, e.g., 1.3 atm., in which process the liquefied gas gradually evaporates while the mixture is heated by heat exchange with a gas or gas mixture to be cooled, according to the invention improvement is obtained by adding the less volatile liquefied gas to said more volatile non-liquefied gas or part thereof after this more volatile non-liquefied gas has passed for an initial period in heat exchange with the gas or gas mixture to be cooled, so as to form a mixture of more volatile non-liquefied gas, saturated with less volatile gas, and less volatile liquefied gas, which mixture has a temperature above the solidification point but below the boiling point at 1 atm. of the liquefied gas and conducting this mixture in heat exchange relation with the gas or gas mixture to be cooled so that the remainder of the liquefied gas evaporates.

In this modified process, saturation of the gas with condensate vapor at a very low temperature level, but above the triple point, is brought about, and, therefore, cooling to the triple point cannot subsequently occur due to evaporation of condensate. The further evaporation consequently can only occur as the temperature of the mixture rises by heat-exchange with the initial gas mixture being cooled.

In carrying out the process according to the invention, in circumstances in which the available quantity of the cold gaseous fraction exceeds the available amount of condensate, which is nearly always the case in practice, sufficient frigories are obtainable at a very low temperature level by adding the condensate to a sufficiently small part of the gaseous fraction to insure that a major part of the condensate will be present in the liquid state in the saturated mixture for evaporating during heat-exchange with the initial gas mixture being cooled. To obtain optimum cold output at a very low temperature level, the ratio of the gaseous fraction to the added condensate fraction must be kept within certain limits.

In employing the present process in the recovery of deuterium from an NH$_3$-synthesis gas mixture, for example, the hydrogen-nitrogen ratio in the saturated mixture should be kept within certain limits which depend on the nitrogen concentration in the original mixture to be separated and on the pressure under which the separation is made, but in all cases the best results with regard to cold economy appear to be obtained when the volume of hydrogen to which the liquid nitrogen is added is about one-third to one-half of the collected quantity of condensed nitrogen, both volumes being expressed in cubic meters, standard pressure and temperature. However, the process can be operated with ratios considerably above and below this range when the condensation is effected at a relatively high pressure, e.g., at 25–30 atm. instead of 10–15 atm. or when the original nitrogen-hydrogen mixture subjected to the fractional condensation contains a high percentage of nitrogen, e.g., 25% or more, instead of 10% or less. In such cases, useful results are obtained when the volume of hydrogen in the saturated mixture is say from 20 to 100% of the volume of nitrogen, whereas if both the condensation pressure and the nitrogen/hydrogen ratio in the original mixture are high, the volume of hydrogen in the saturated mixture may be larger, say up to twice the volume of nitrogen.

The process according to the invention will be explained with the help of the following examples showing the fractional condensation and distillation of hydrogen to recover deuterium, in which process in the cold recovery system, the condensate fraction (nitrogen) is mixed with the more volatile fraction (hydrogen) at a temperature only a few degrees, e.g., 1° K. to 4° K., above the triple point of the nitrogen. The examples refer to the accompanying drawing which is a flow sheet illustrating the process.

*Example 1*

In order to recover deuterium from a H$_2$/N$_2$ mixture (vol. ratio 4:1), obtained by separation of hydrogen from coke oven gas and washing with liquid nitrogen, by rectification of the hydrogen, 12,500 m.$^3$/hr. (S.T.P.) of the mixture of hydrogen and nitrogen at a pressure of approximately 10 atm. were fed through pipe 1 to a heat-exchanger 2 to be cooled in countercurrent with the hydrogen returning from the rectification. Ultimately the temperature dropped to 65.5° K. with the result that a large part of the nitrogen, namely 2220 m.$^3$ (S.T.P.) was condensed. The liquid nitrogen was collected in a reservoir 3. Of the 2220 m.$^3$ (S.T.P.) of N$_2$ only 600 m.$^3$ (S.T.P.) liquefied at temperatures above 81° K., while 1620 m.$^3$ (S.T.P.) condensed in the temperature range between 65.5° K. and 81° K. From the reservoir 3 the hydrogen, in which only little nitrogen was left (2.72% by volume), passed via pipe 4, valves 20 being open and valves 21 being closed, to one compartment A of the reversing cold accumulator 5 where the remaining nitrogen deposited as a solid, after which the hydrogen passed on to the fractionating column 19 via pipe 4a.

The deuterium is separated from the hydrogen in fractionating column 19 and the deuterium-free top product returned at a pressure of 1.3 atm. and a temperature of 25° K. through pipe 6a, and thence through the other compartment B of the cold accumulator 5. Its temperature slowly rose during the latter step and in doing so absorbed the solid nitrogen previously deposited in that compartment. When compartment A becomes inoperative due to the accumulation of solid nitrogen therein, valves 20 are closed and valves 21 are opened; then the hydrogen coming from reservoir 3 is passing compartment B and the hydrogen coming from the top of column 19 is passing compartment A. The hydrogen left the cold accumulator 5 at a temperature of 61.5° K. laden with 2.72% by volume of N$_2$ and flowed through pipe 6 to heat-exchanger 2 in which the temperature of the rectified hydrogen/nitrogen mixture gradually rose as it passed in countercurrent heat-exchange relation to the gas mixture to be cooled.

After the mixture of rectified hydrogen and nitrogen had been warmed up by about 70°, one-tenth of its volume, i.e., 1000 m.$^3$ H$_2$+28 m.$^3$ N$_2$ (S.T.P.) was carried off via valve 7c and pipe 8 and mixed with liquid nitrogen supplied along pipe 9, and the resulting mixture was fed to the coldest part of the heat-exchanger 2 via pipe 10. In pipe 10, therefore, 1028 m.$^3$ (S.T.P.) of a H$_2$/N$_2$ mixture, having a temperature of 131.2° K. were mixed with 2220 m.$^3$ (S.T.P.) of liquid nitrogen having a temperature of 65.5° K. The temperature after mixing was 65° K., which is only a few degrees above the temperature (63.2° K.) at which nitrogen solidifies. During this mixing, 254 m.$^3$ (S.T.P.) of nitrogen evaporated with the result that the mixture was saturated with nitrogen vapor while 1966 m.$^3$ N$_2$ (S.T.P.) were left in the liquid state. During the subsequent passage of the mixture along pipe 10 through the heat-exchanger 2, in counter-current relation to the gas to be cooled, the remaining liquid nitrogen was evaporated at a very low temperature, namely, below the partial nitrogen pressure of 1 atm.

In this manner the frigories in the temperature range 65.5° K.–81° K. needed for condensing nitrogen in the original gas mixture to be separated were advantageously obtained, that is to say, without it being necessary to evaporate under vacuum by means of vacuum pumps or by compression and subsequent expansion.

The H$_2$/N$_2$ mixtures leaving through pipes 11 and 12 may be combined again at the top of the heat-exchanger 2 and carried away via pipe 13.

*Example 2*

When a H$_2$/N$_2$ mixture (vol. ratio 10:1) is cooled down in the way described in Example 1 under a pressure of 10 atm. and fed to heat-exchanger 2 at a rate of 11,000 m.$^3$/hr. (S.T.P.), an amount of 720 m.$^3$ (S.T.P) of nitrogen ultimately condenses. The condensation starts only at a temperature below 81° K. The hydrogen thus freed from a large part of the nitrogen passes via pipe 4 to one compartment of the reversible cold accumulator 5 where the remaining nitrogen deposits as a solid.

The hydrogen passes via pipe 4a to the fractionating column 19 where a separation is effected between hydrogen and deuterium; the deuterium-free top product returns under a pressure of 1.3 atm. via pipe 6a through the other compartment of the cold accumulator 5 and takes up the solid nitrogen previously deposited in that compartment. Just as in Example 1, the rectified hydrogen, loaded with 2.72% by volume of N$_2$ and having a temperature of 61.5° K. now flows, via pipe 6, to the heat-exchanger 2 for cooling the arriving current of gas mixture during which process the mixture of rectified hydrogen and nitrogen rises in temperature. At a level where the temperature of the mixture of rectified hydrogen and nitrogen is about 60° higher than its temperature on entry into the heat-exchanger, 257 m.$^3$ (S.T.P.) of the mixture are carried off via valve 7b and pipe 8 and added to the 720 m.$^3$ of liquid nitrogen (S.T.P) supplied from reservoir 3 via pipe 9. The resulting nitrogen/hydrogen mixture is saturated with nitrogen and has a temperature of 65° K. This mixture passes via pipe 10 to the coldest section of heat-exchanger 2 and in the heat-exchanger it becomes warmed up by the gas to be separated flowing counter-currently, the latter gas being consequently cooled.

During the mixing of the gaseous fraction withdrawn via valve 7b with the liquefied nitrogen from reservoir 3, 63.5 m.$^3$ (S.T.P.) of nitrogen evaporates immediately; the cold of evaporation of the 656.5 m.$^3$ (S.T.P.) of nitrogen left in the liquid state is utilized for condensing the nitrogen in the gas mixture supplied via pipe 1.

Example 3

If the hydrogen/nitrogen mixture of Example 2 is separated at 20 instead of at 10 atm. 590 m.$^3$ (S.T.P.) of the 720 m.$^3$ (S.T.P) of liquid nitrogen condense below a temperature of 81° K. The decrease in the amount of nitrogen condensing below 81° K. is due to the higher separation pressure. Consequently, the amount of nitrogen which has to provide the cold of evaporation needed for this condensation may also be decreased. This means that the liquid nitrogen supplied through pipe 9 may be mixed with a larger volume of gas mixture supplied along pipe 8. Thus, when instead of 250 m.$^3$ H$_2$+7 m.$^3$ N$_2$ (S.T.P.) as in Example 2, twice the amount, if supplied through pipe 8, 127 m.$^3$ (S.T.P.) of liquid nitrogen immediately evaporates in pipe 10 leaving 593 m.$^3$ (S.T.P.) as a liquid. The cold of evaporation supplied by this liquid nitrogen entirely covers the cold requirements for condensing the nitrogen in the original gas mixture below 81° K.

Unless otherwise stated, all gas volumes are measured at S.T.P.

I claim:

1. A process for obtaining cooling in the process of preparation of deuterium from an initial gas mixture of hydrogen, deuterium and nitrogen comprising feeding said gas mixture to a heat exchanger, condensing a large portion of the nitrogen in said heat-exchanger, collecting the liquid nitrogen, passing the hydrogen and deuterium containing a small amount of nitrogen to one zone of a reversing cold accumulator, depositing the remaining nitrogen therein as a solid, fractionating the deuterium-hydrogen mixture to obtain a deuterium bottoms fraction and a hydrogen top fraction, returning the rectified hydrogen fraction to the other compartment of the cold accumulator and absorbing previously deposited solid nitrogen therein, returning the nitrogen containing rectified hydrogen to the initial heat-exchanger and passing it in countercurrent heat-exchange relation to the initial gas mixture, whereby the nitrogen containing rectified hydrogen is warmed and the initial gas mixture is cooled, bleeding off a small fraction of the warmed nitrogen-rectified hydrogen mixture, blending said small fraction with liquid nitrogen to saturate said small fraction with nitrogen and feeding the resulting mixture to the coldest portion of the heat-exchanger at a temperature above the solidification point but below the boiling point at 1 atm. of the nitrogen.

2. A process for obtaining cooling in the process of preparation of deuterium from an initial gas mixture of hydrogen, deuterium and a less volatile gas of the group consisting of nitrogen, carbon monoxide, argon and methane comprising feeding said gas mixture to a heat exchanger, condensing a large portion of the less volatile gas in said heat exchanger, collecting the liquid less volatile gas, passing the hydrogen and deuterium containing a small amount of the less volatile gas to one zone of a reversing cold accumulator, depositing the remaining less volatile gas therein as a solid, fractionating the deuterium-hydrogen mixture to obtain a deuterium bottoms fraction and a hydrogen top fraction, returning the rectified hydrogen fraction to the other compartment of the cold accumulator and absorbing previously deposited solid less volatile gas therein, returning the less volatile gas containing rectified hydrogen to the initial heat exchanger and passing it in countercurrent heat exchange relation to the initial gas mixture, whereby the less volatile gas containing rectified hydrogen is warmed and the initial gas mixture is cooled, bleeding off a small fraction of the warmed less volatile gas-rectified hydrogen mixture, blending said small fraction with liquid less volatile gas to saturate said small fraction with less volatile gas and feeding the resulting mixture to the coldest portion of the heat exchanger at a temperature above the solidification point but below the boiling point at 1 atm. of the less volatile gas.

References Cited in the file of this patent

UNITED STATES PATENTS 2,760,352    Hachmuth  ---------------  Aug. 28, 1956